(12) United States Patent
Wu et al.

(10) Patent No.: US 10,271,363 B2
(45) Date of Patent: Apr. 23, 2019

(54) DEVICE DISCOVERY METHOD AND USER EQUIPMENT, AND NETWORK-SIDE DEVICE

(71) Applicant: ZTE CORPORATION, Shenzhen, Guangdong Province (CN)

(72) Inventors: Shuanshuan Wu, Shenzhen (CN); Feng Liang, Shenzhen (CN); Lin Chen, Shenzhen (CN); Jin Yang, Shenzhen (CN); Ming Yuan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 126 days.

(21) Appl. No.: 14/910,584

(22) PCT Filed: Jun. 24, 2014

(86) PCT No.: PCT/CN2014/080637
§ 371 (c)(1),
(2) Date: Feb. 5, 2016

(87) PCT Pub. No.: WO2015/018239
PCT Pub. Date: Feb. 12, 2015

(65) Prior Publication Data
US 2016/0198507 A1    Jul. 7, 2016

(30) Foreign Application Priority Data

Aug. 8, 2013   (CN) .......................... 2013 1 0343919

(51) Int. Cl.
*H04W 76/00* (2018.01)
*H04W 8/00* (2009.01)
(Continued)

(52) U.S. Cl.
CPC ........... *H04W 76/14* (2018.02); *H04W 8/005* (2013.01); *H04W 72/044* (2013.01); *H04W 72/0446* (2013.01)

(58) Field of Classification Search
CPC . H04W 8/005; H04W 76/023; H04W 76/043; H04W 76/14; H04W 76/23; H04L 5/0035–5/0055
See application file for complete search history.

(56) References Cited

U.S. PATENT DOCUMENTS

| 7,873,710 B2 | 1/2011 | Kiley et al. |
| 2010/0165882 A1 | 7/2010 | Palanki et al. |

(Continued)

FOREIGN PATENT DOCUMENTS

| CN | 102265699 A | 11/2011 |
| CN | 102334353 A | 1/2012 |

(Continued)

OTHER PUBLICATIONS

Ericsson et al: "Direct Discovery for LTE Based D2D" 3GPP TSG-RAN WG1 #73, Fukuoka, Japan, May 20-24, 2013, R1-132031.
(Continued)

*Primary Examiner* — Marcus Smith
(74) *Attorney, Agent, or Firm* — Plumsea Law Group, LLC (57) ABSTRACT

A device discovery method, a user equipment and a network side device are disclosed, which relates to the field of wireless communication. The method disclosed in the embodiments of the present document includes: the user equipment acquiring device discovery configuration information, the device discovery configuration information at least including information used for indicating a time domain location of a device discovery radio resource; the user equipment determining a radio resource location for
(Continued)

The first user equipment receives device discovery configuration information, and the device discovery configuration information at least includes information used for indicating a time domain location of a device discovery radio resource — S802

The first user equipment determines a radio resource location for sending a D2D discovery signal and sends the D2D discovery signal at the determined radio resource location — S804 sending a D2D discovery signal according to the device discovery configuration information; and the user equipment sending the D2D discovery signal at the determined radio resource location; wherein, the device discovery radio resource indicated by the device discovery configuration information is a D2D dedicated resource, and has a specific configuration period in a time domain. The embodiments of the present document also disclose a user equipment and a network side device.

7 Claims, 7 Drawing Sheets

(51) Int. Cl.
*H04W 76/14* (2018.01)
*H04W 72/04* (2009.01)

(56) References Cited

U.S. PATENT DOCUMENTS

| | | | | |
|---|---|---|---|---|
| 2010/0211679 | A1 | 8/2010 | Kumar et al. | |
| 2014/0328329 | A1* | 11/2014 | Novlan | H04W 72/042 370/336 |
| 2014/0334354 | A1* | 11/2014 | Sartori | H04W 8/005 370/280 |
| 2015/0139006 | A1* | 5/2015 | Seo | H04J 11/005 370/252 |
| 2015/0173113 | A1* | 6/2015 | Liu | H04W 72/042 370/329 |
| 2015/0181406 | A1* | 6/2015 | Seo | H04W 76/023 370/329 |
| 2015/0264551 | A1* | 9/2015 | Ko | H04W 8/005 370/329 |
| 2015/0289305 | A1* | 10/2015 | Tong | H04W 8/005 370/329 |
| 2015/0327048 | A1* | 11/2015 | Lee | H04W 8/005 370/329 |
| 2016/0112858 | A1* | 4/2016 | Nguyen | H04W 8/005 370/329 |

FOREIGN PATENT DOCUMENTS

| | | |
|---|---|---|
| CN | 102547871 A | 7/2012 |
| CN | 102857901 A | 1/2013 |
| CN | 103079260 A | 5/2013 |
| CN | 103188742 A | 7/2013 |
| EP | 2793520 A1 | 10/2014 |
| WO | 2013006648 A1 | 1/2013 |
| WO | 2013107277 A1 | 7/2013 |

OTHER PUBLICATIONS

English description dated Jul. 4, 2012 of corresponding document CN102547871 A.
European Search Report dated Jun. 17, 2016 in European Patent Application No. 14834713.1.
Huawei, HiSilicon "Physical layer options for D2D discovery" 3GPP TSG RAN WG1 Meeting #73, Fukuoka, Japan, May 20-24, 2013. R1-131864.
International Search Report and Written Opinion dated Oct. 9, 2014 in PCT Application No. PCT/CN2014/080637.
Communication Pursuant to Article 94(3) dated Jul. 4, 2018 for European Patent Application No. 14834731.1 (7pp).
Office Action dated Sep. 12, 2018 in Chinese Patent Application No. 201310343919.6 (16pp).

\* cited by examiner

DEVICE DISCOVERY METHOD AND USER EQUIPMENT, AND NETWORK-SIDE DEVICE

CROSS-REFERENCE TO RELATED APPLICATION(S)

This application is the U.S. National Phase application of PCT application number PCT/CN2014/080637 having a PCT filing date of Jun. 24, 2014, which claims priority of Chinese patent application 201310343919.6 filed on Aug. 8, 2013, the disclosures of which are hereby incorporated by reference.

TECHNICAL FIELD

The document relates to the field of device discovery, and specifically, to a device discovery method and a user equipment, and a network side device.

BACKGROUND OF RELATED ART

Figure 1A:
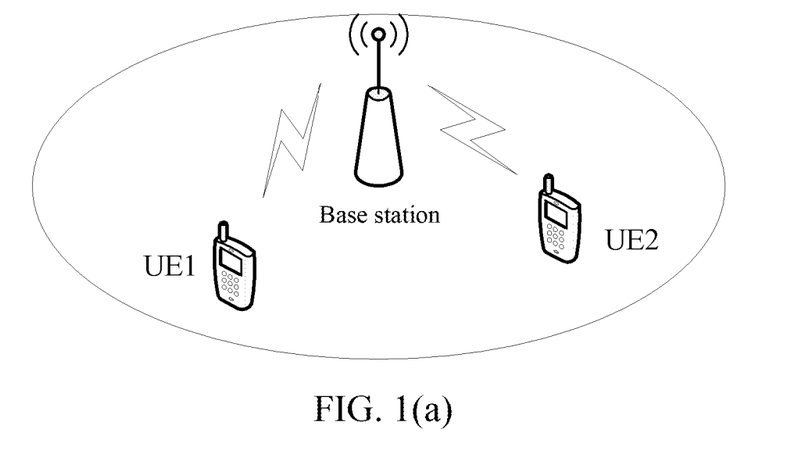

In a cellular communication system, when there is service transmission between two User Equipments (UEs), for example, service data from a user equipment 1 (UE1) to a user equipment 2 (UE2) firstly are transmitted to a Base Station (or referred to as a Node B or an evolved Node B) of a cell in which the UE1 is located via an air interface, the base station transmits the user data to a base station of a cell in which the UE2 is located via a core network, and the base station then transmits the above service data to the UE2 via an air interface. The similar processing flow is adopted in the service data transmission from the UE2 to the UE1. As shown in FIG. 1 (*a*), when the UE1 and the UE2 are located in the same cellular cell, though the two UEs are covered by the cell of the same base station, the data are still required to be transferred via the core network when transmitted, and one time of the data transmission still consumes two wireless spectrum resources.

Figure 1B:
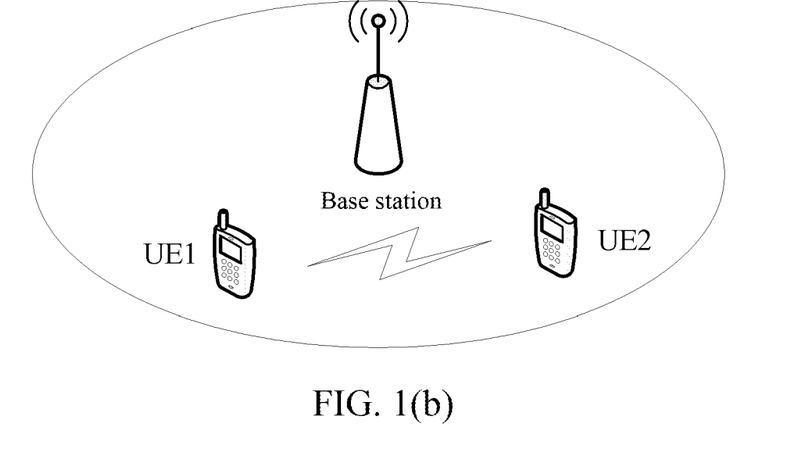

Thus it can be seen that, if the user equipment 1 and the user equipment 2 are located in the same cell and in a close distance, the above cellular communication method is apparently not optimal. Moreover, in fact, with the diversification of the mobile communication services, such as the popularization of the applications like social networks and electronic payment and so on in the wireless communication system, the demand for service transmission between short-distance users is ever increasing. Therefore, the Device-to-Device (D2D) communication mode has increasingly attracted widespread attention. As shown in FIG. 1 (*b*), D2D refers to that the service data are directly transmitted by a source user equipment to a target user equipment via an air interface without forwarding of the base station and the core network, and it also can be called Proximity Service (ProSe). For the users in the near field communication, the D2D not only saves the wireless spectrum resources but also reduces the data transmission pressure of the core network.

In the cellular communication, when two UEs perform communication, as a general rule, the UE itself does not know the location of the opposite-side UE, and a connection of the two UEs is established through a network side device (such as the base station or the core network device). But, for the D2D communication, a premise for establishing the communication link is the mutual discovery between the UEs. However, in the related art, with respect to the problem of how the UE discovers an adjacent UE (or also can be called companion discovery or device discovery), no effective solution has been put forward at present.

SUMMARY

The technical problem to be solved in the embodiments of the document is to provide a device discovery method and a user equipment, and a network side device, to solve the problem of how the UE discovers an adjacent UE.

In order to solve the above technical problem, the embodiments of the document disclose a device discovery method, comprising:

a user equipment acquiring device discovery configuration information, wherein the device discovery configuration information at least comprises information used for indicating a time domain location of a device discovery radio resource;

the user equipment determining a radio resource location for sending a device-to-device (D2D) discovery signal according to the device discovery configuration information; and the user equipment sending the D2D discovery signal at the determined radio resource location;

wherein, the device discovery radio resource is a D2D dedicated resource, and has a configuration period in a time domain, the configuration period of the device discovery radio resource comprises one or more time units of the device discovery radio resource, a time unit of the device discovery radio resource comprises one or more time elements, and the time elements are symbols, slots or sub-frames.

Alternatively, in the above method, the user equipment sending the D2D discovery signal at the determined radio resource location refers to:

the user equipment sending the D2D discovery signal according to a sending period at the determined radio resource location.

Alternatively, in the above method, the user equipment determining the sending period in any one of the following ways:

determining the sending period in a random way;

the user equipment determining the sending period according to common configuration information or user equipment-specific configuration information;

determining the sending period according to a pre-determined rule.

Alternatively, in the above method, determining the sending period in a random way refers to:

the user equipment randomly selecting a sending period, wherein, the selected sending period is an integral multiple of the configuration period of the device discovery radio resource, each sending period comprises one or more time units of the device discovery radio resource indicated by the device discovery configuration information.

Alternatively, in the above method, when the user equipment determines the sending period in the random way, the user equipment sending the D2D discovery signal according to a sending period at the determined radio resource location refers to:

the user equipment randomly selecting time units of the device discovery radio resource within the sending period to send the D2D discovery signal; or the user equipment calculating a time unit location used for sending the D2D discovery signal within the sending period according to the pre-determined rule, and sending the D2D discovery signal at the calculated time unit location.

Alternatively, in the above method, the user equipment determining the sending period according to common configuration information or user equipment-specific configuration information refers to:

the user equipment determining that the sending period is an integral multiple of the configuration period of the device discovery radio resource, each sending period comprising one or more time units of the device discovery radio resource indicated by the device discovery configuration information.

Alternatively, in the above method, when the user equipment determines the sending period according to the common configuration information or the user equipment-specific configuration information, the user equipment sending the D2D discovery signal according to a sending period at the determined radio resource location refers to:

the user equipment randomly selecting time units of the device discovery radio resource within the sending period to send the D2D discovery signal; or indicating a time unit location of the D2D discovery signal within the sending period through the common configuration information or the user equipment-specific configuration information, and sending the D2D discovery signal at the time unit location; or the user equipment calculating a time unit location used for sending the D2D discovery signal within the sending period according to the pre-determined rule, and sending the D2D discovery signal at the calculated time unit location.

Alternatively, in the above method, determining the sending period according to a pre-determined rule refers to:

there existing a pre-determined multiple relationship between the sending period and the configuration period of the device discovery radio resource, the sending period comprising one or more device discovery time units indicated by the device discovery configuration information.

Alternatively, in the above method, when the user equipment determines the sending period according to the pre-determined rule, the user equipment sending the D2D discovery signal according to the sending period at the determined radio resource location refers to:

the user equipment randomly selecting time units of the device discovery radio resource within the sending period to send the D2D discovery signal; or the user equipment determining a time unit location used for sending the D2D discovery signal within the sending period according to the common configuration information or the user equipment-specific configuration information, and sending the D2D discovery signal at the determined time unit location; or the user equipment calculating a time unit location used for sending the D2D discovery signal within the sending period according to the pre-determined rule, and sending the D2D discovery signal at the calculated time unit location.

Alternatively, in the above method, the user equipment determining a radio resource location for sending a D2D discovery signal according to the device discovery configuration information, and sending the D2D discovery signal at the determined radio resource location refers to:

the user equipment randomly selecting time units for sending the D2D discovery signal from the device discovery radio resource indicated by the device discovery configuration information, and randomly selecting a time interval for sending the D2D discovery signal next time.

Alternatively, in the above method, when the user equipment sends the D2D discovery signal at the determined radio resource location:

the D2D discovery signal is sent according to downlink receiving timing of a cellular link; or the D2D discovery signal is sent according to uplink transmitting timing of the cellular link; or the D2D discovery signal is sent according to timing determined in accordance with a timing advance parameter carried in the device discovery configuration information; or timing is determined in accordance with an RRC state of the user equipment sending the D2D discovery signal, when the user equipment is in a connected state, the D2D discovery signal is sent according to the uplink transmitting timing of the cellular link, and when the user equipment is in a non-connected state, the D2D discovery signal is sent according to the downlink receiving timing of the cellular link; or timing is determined in accordance with a cellular link uplink synchronization state of the user equipment sending the D2D discovery signal, when the user equipment is in uplink synchronization, the D2D discovery signal is sent according to the uplink transmitting timing of the cellular link, and when the user equipment is in an uplink non-synchronization state, the D2D discovery signal is sent according to the downlink receiving timing of the cellular link; or receiving timing is obtained by monitoring a D2D discovery signal of another user equipment, and the D2D discovery signal is sent according to the obtained receiving timing.

Alternatively, in the above method, the device discovery configuration information further comprises configuration parameters of a discovery channel, and the configuration parameters of the discovery channel comprise one or two of the following:

a time domain symbol location for transmitting the D2D discovery signal in the time unit of the device discovery radio resource, and a frequency domain resource block location for transmitting the D2D discovery signal.

Alternatively, in the above method, the user equipment acquiring device discovery configuration information refers to:

the user equipment acquiring the device discovery configuration information from a network side device of a cellular network or another user equipment.

The embodiments of the document further disclose a user equipment, comprising:

a receiving module, acquiring device discovery configuration information, wherein the device discovery configuration information comprises information used for indicating a time domain location of a device discovery radio resource;

a discovery control module, determining a radio resource location for sending a device-to-device (D2D) discovery signal according to the device discovery configuration information; and a sending module, sending the D2D discovery signal at the determined radio resource location;

wherein, the device discovery radio resource indicated by the device discovery configuration information is a D2D dedicated resource, and has a specific configuration period in a time domain, the configuration period of the device discovery radio resource comprises one or more time units of the device discovery radio resource, a time unit of the device discovery radio resources comprises one or more time elements, and the time elements are symbols, slots or subframes.

Alternatively, in the above user equipment, the sending module sends the D2D discovery signal according to a sending period at the determined radio resource location; or randomly selects time units of the device discovery radio resource from the device discovery radio resource indicated by the device discovery configuration information and sends the D2D discovery signal, and randomly selects a time interval for sending the D2D discovery signal next time.

Alternatively, in the above user equipment, when sending the D2D discovery signal according to the sending period at the determined radio resource location, the sending module determines the sending period in any one of the following ways:

determining the sending period in a random way;

determining the sending period according to common configuration information or user equipment-specific configuration information;

determining the sending period according to a pre-determined rule.

Alternatively, in the above user equipment, the sending module sending the D2D discovery signal at the determined radio resource location refers to:

sending the D2D discovery signal according to downlink receiving timing of a cellular link; or sending the D2D discovery signal according to uplink transmitting timing of the cellular link; or sending the D2D discovery signal according to a timing advance parameter carried in the device discovery configuration information; or determining timing in accordance with an RRC state of the UE sending the D2D discovery signal, when the UE is in a connected state, sending the D2D discovery signal according to the uplink transmitting timing of the cellular link, and when the UE is in a non-connected state, sending the D2D discovery signal according to the downlink receiving timing of the cellular link; or determining timing in accordance with a cellular link uplink synchronization state of the UE sending the D2D discovery signal, when the UE is in uplink synchronization, sending the D2D discovery signal according to the uplink transmitting timing of the cellular link, and when the UE is in an uplink non-synchronization state, sending the D2D discovery signal according to the downlink receiving timing of the cellular link; or obtaining receiving timing by monitoring a D2D discovery signal of another equipment, and sending the D2D discovery signal according to the obtained receiving timing.

The embodiments of the document further disclose a network side device, comprising:

a configuration module, configuring device discovery configuration information, wherein the device discovery configuration information at least comprises a signal used for indicating a time domain location of a device discovery radio resource, wherein, the device discovery radio resource indicated by the device discovery configuration information is a device-to-device (D2D) dedicated resource, and has a specific configuration period in a time domain, the configuration period of the device discovery radio resource comprises one or more time units of the device discovery radio resource, a time unit of the device discovery radio resource comprises one or more time elements, and the time elements are symbols, slots or subframes;

a sending module, broadcasting the device discovery configuration information.

Alternatively, in the above network side device, the device discovery configuration information further comprises configuration parameters of a discovery channel, and the configuration parameters of the discovery channel comprise any one or two of the following: a time domain symbol location for transmitting the D2D discovery signal in the time unit of the device discovery radio resource, and a frequency domain resource block location for transmitting the D2D discovery signal.

In conclusion, through the technical scheme of the document, the discovery problem of the D2D communication system can be solved, and a D2D discovery by a UE in an idle state is compatible a D2D discovery by a UE in a connected state. The technical scheme of the document can also effectively avoid the problem of the failure of mutual discovery between UEs caused by different UEs simultaneously sending and monitoring the discovery signal, thus improving the universality of the device discovery method and device, and the periodic sending mode facilitates the terminal to track the discovery signal; and the technical scheme of the document also can apply to the device discovery in a scenario without network coverage in the meantime.

BRIEF DESCRIPTION OF THE DRAWINGS

FIG. 1 (a) is a schematic diagram of cellular communication between UEs located in the cell of the same base station in the related art;

FIG. 1 (b) is a schematic diagram of D2D communication in the related art;

FIG. 10 (a) is schematic diagram 1 of a D2D discovery radio resource configuration method according to the embodiment of the document;

FIG. 10 (b) is schematic diagram 2 of the D2D discovery radio resource configuration method according to the embodiment of the document;

FIG. 10 (c) is schematic diagram 3 of the D2D discovery radio resource configuration method according to the embodiment of the document.

PREFERRED EMBODIMENTS OF THE INVENTION

The technical scheme of the embodiments of the document will be further described in detail in combination with the accompanying drawings below. It should be noted that the embodiments in the document and the features in the embodiments can be optionally combined with each other in the case of no conflict.

The technology mentioned in the document is applicable to a cellular wireless communication system or network. A common cellular wireless communication system can be based on the Code Division Multiplexing Access (CDMA) technology, Frequency Division Multiplexing Access (FDMA) technology, Orthogonal-FDMA (OFDMA) technology and Single Carrier-FDMA (SC-FDMA) technology and so on. For example, a down link (or referred to as a forward link) of the 3rd Generation Partnership Project (3GPP) Long Term Evolution (LTE)/LTE-Advanced (LTE-A) cellular communication system is based on the OFDMA technology, and an up link (or referred to as a reverse link) is based on the SC-FDMA multiplexing access technology. The hybrid multiplexing access technology may be supported on one link in the future.

Figure 2:
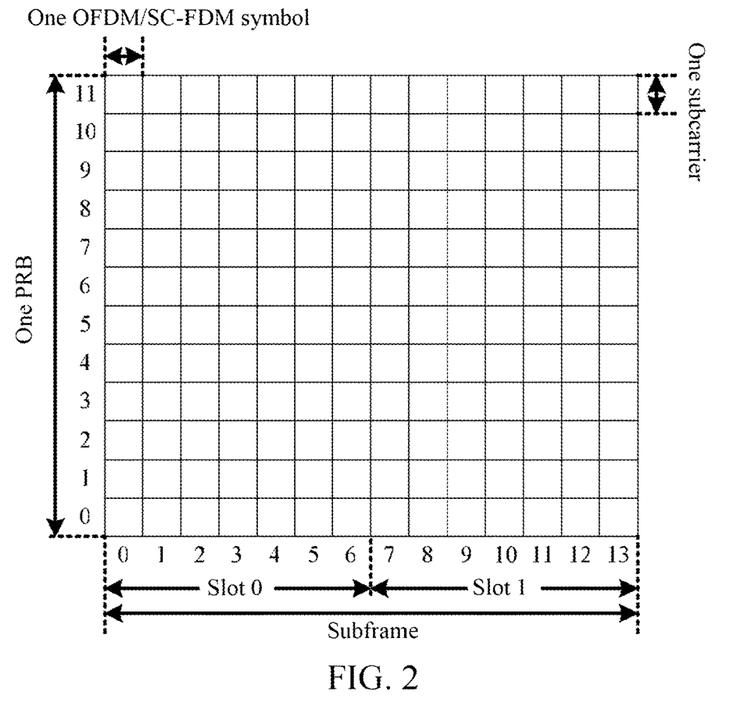
FIG. 2 is a schematic diagram of the radio resource structure in the related art.

In the OFDMA/SC-FDMA system, Radio Resource used for communication is in a time-frequency two-dimensional form. For example, with regard to the LTE/LTE-A system, the uplink and downlink communication resources are all divided with a radio frame as a unit in a time direction, each radio frame has a length of 10 ms and contains 10 subframes with a length of 1 ms, and each subframe includes two slots with a length of 0.5 ms, as shown in FIG. 2. Moreover, according to different configurations of the Cyclic Prefix (CP), each slot can include 6 or 7 OFDM or SC-FDM symbols.

In a frequency direction, resources are divided with a subcarrier as a unit, and specifically, in communications, a minimum unit of the frequency domain resource allocation is a Resource Block (RB), corresponding to one Physical RB (PRB) of the physical resources. One PRB contains 12 sub-carriers in the frequency domain, corresponding to one slot in the time domain. Resources corresponding to one subcarrier on each OFDM/SC-FDM symbol are called a Resource Element (RE).

In the LTE/LTE-A cellular communication, the user equipment UE discovers an LTE network by detecting a Synchronization Signal (SS). The synchronization signal includes a Primary SS (PSS) and a Secondary SS (SSS). By detecting the synchronization signal, the UE obtains the synchronization with the downlink frequency and time of the base station. Moreover, since the synchronization signal carries a physical cell identity, detecting the synchronization signal also means that the UE discovers an LTE/LTE-A cell.

In the uplink, when the UE has uplink data to be transmitted, it is required to initiate Random Access (RA) to perform uplink synchronization and establish a Radio Resource Control (RRC) connection, that is, to enter an RRC Connected state from an RRC Idle state. The UE needs to send a random access preamble during the random access, and the network side achieves the identification of the UE and the uplink synchronization by detecting the random access preamble in a specific time-frequency resource.

During the D2D communication, there is also a similar problem of mutual discovery between communication devices, that is, the UE performing the D2D communication is firstly required to implement the mutual discovery, which is referred to as discovery of D2D communication or D2D discovery or device discovery in the document. In the document, the D2D discovery is carried out through transmission and detection of the Discovery Signal. The discovery signal can be in the form of sequence, such as a synchronization signal in the cellular network, a random access preamble and a reference signal, or can be a sequence with a similar structure as the foregoing sequence, or also can be in the form of other sequences, such as other Zadoff-Chu (ZC) sequence or a Walsh code; the discovery signal can also be a data block or a message, and has a specific modulation and coding scheme; and the discovery signal can also be in the form of sequence+data block or message. In the document, a physical channel for transmitting a D2D discovery signal is named a Physical ProSe Discovery Channel (PPDCH). It should be noted that the naming is only for a simple description but does not constitute a limitation to the related methods.

Figure 3:
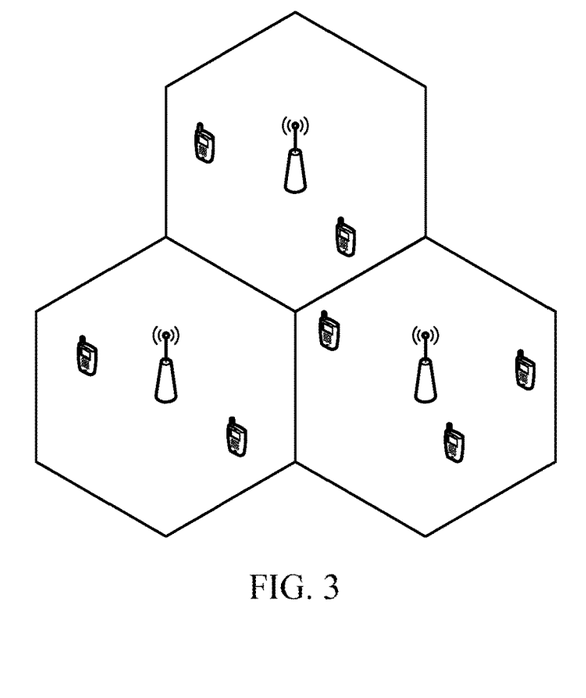
FIG. 3 is a schematic diagram of the cellular network deployment in the related art.

FIG. 3 shows a schematic diagram of the network deployment of the cellular wireless communication system. What is shown in the figure can be a 3GPP LTE/LTE-A system or other cellular wireless communication technologies. In an access network of the cellular wireless communication system, network devices generally include a certain number of base stations (or referred to as Nodes B or evolved Nodes B (eNB) or enhanced Nodes B (eNB)) and other network entities or network elements. Or, in summary, the network devices can be collectively referred to as a network side (an Evolved Universal Terrestrial Radio Access Network (E-UTRAN)) in the 3GPP. The base stations mentioned here also include a Low Power Node (LPN) in the network, such as a femto or a home base station (a pico, Relay, femto, Home eNB (HeNB), etc.). For a simple description, only 3 base stations are shown in FIG. 3. The base stations provide a certain wireless signal coverage scope and a terminal (or referred to as a User Equipment (UE) or a device) within the coverage scope can perform wireless communication with the base stations. A wireless signal coverage area of one base station may be divided into one or more cells or sectors based on certain criterions, for example, it may be three cells.

At present, the application of the D2D discovery discussed in the 3GPP includes two discriminative scenarios: an in-network scenario and an out-of-network scenario. The in-network refers to that the UEs performing D2D discovery are located within the coverage of the cellular network, such as the scenario shown in FIG. 3; the out-of-network refers to that there is no cellular network coverage in the locations of part or all of the UEs performing D2D discovery, such as a coverage blind area which the network coverage itself does not reach, or a coverage blind area generated by the damage of the network device.

Embodiment 1

The present embodiment provides a wireless communication system, and the system can implement the discovery during the D2D communication in a cellular communication system.

Figure 4:
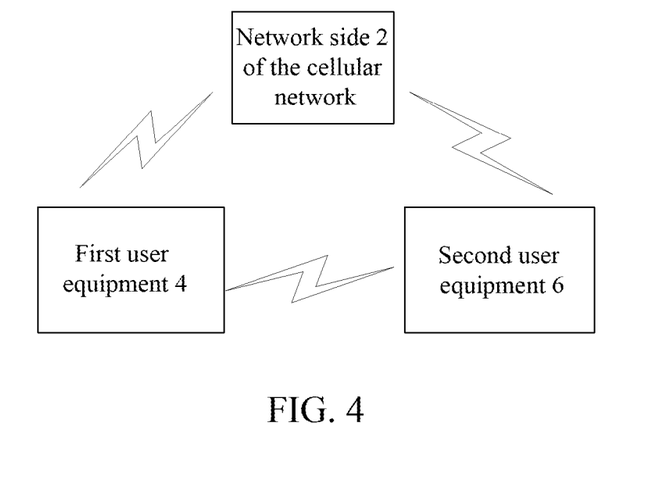
FIG. 4 is a schematic diagram of structure of a wireless communication system according to the embodiment of the document.

FIG. 4 is a schematic diagram of structure of the wireless communication system of the present embodiment, and as shown in FIG. 4, the wireless communication system at least includes: a network side device (2) of the cellular network, a first user equipment (4) and a second user equipment (6). The above entities will be described respectively below.

Figure 5:
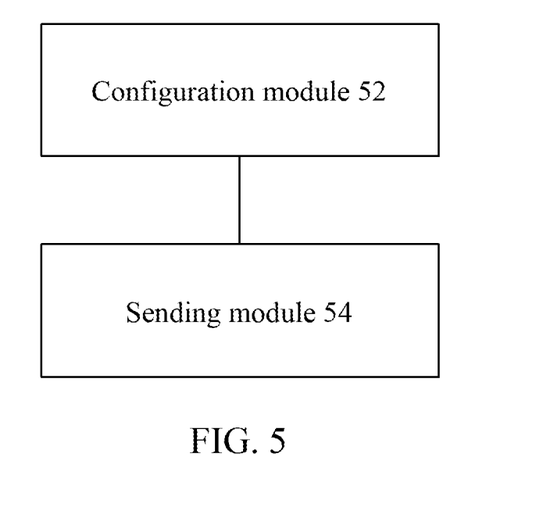
FIG. 5 is a schematic diagram of structure of communication device 1 according to the embodiment of the document.

The network side device (2) of the cellular network can include a communication device as shown in FIG. 5. As shown in FIG. 5, the communication device in the D2D communication system can include:

a configuration module 52, used for configuring D2D discovery configuration information, the device discovery configuration information at least including a signal used for indicating a time domain location of the device discovery radio resource, wherein, the device discovery radio resource indicated by the device discovery configuration information is a D2D dedicated resource, and has a specific configuration period in a time domain, s one or more time units of the device discovery radio resource are included within the configuration period of the device discovery radio resource, a time unit of the device discovery radio resource includes one or more time elements, and the time elements are symbols, slots or subframes;

a sending module 54, used for broadcasting and sending the above device discovery configuration information.

Specifically, the device discovery configuration information carries configuration parameters of the D2D device discovery, and the configuration parameters at least include parameters used for indicating a time location of the device discovery radio resource. The indicated time location of the radio resource can be represented in a form of time unit, and the time unit can be one or several continuous subframes, or one or several continuous slots, or one or several continuous OFDM/SC-FDM symbols. The time unit used for representing the time location of the radio resource can be configured and repeated in a periodic way in a time direction.

In one embodiment, the above device discovery configuration information also can carry a timing advance parameter of the D2D discovery, and the timing advance parameter is used for the D2D UE determining the timing of sending and/or detecting a D2D discovery signal.

In one embodiment, the above device discovery configuration information also can carry configuration parameters of a discovery channel transmitting the D2D discovery signal. The D2D UE determines configurations of a physical channel for sending and/or detecting the D2D discovery signal according to the configuration parameters.

Wherein, the configuration parameters of the discovery channel include a time domain OFDM/SC-FDM symbol location for transmitting the D2D discovery signal in the time unit of the device discovery radio resource, and/or a frequency domain resource block RB location for transmitting the D2D discovery signal.

For the D2D UE, when the above configuration parameters of the discovery channel are acquired from the device discovery configuration information, if only the time domain symbol location for transmitting the D2D discovery signal or the frequency domain resource block location for transmitting the D2D discovery signal in the time unit of the device discovery radio resources is acquired, the other information can be determined according to a pre-determined rule.

In one embodiment, the above configuration message can be sent in the form of broadcasting, for example, it can be borne in a System Information Block (SIB) to be sent, and the system information block can be exclusively used for the D2D communication or D2D discovery.

In one embodiment, the network side device 2 can be a base station or an eNB, or other network access devices such as a small cell, and it can also be higher-layer network nodes, such as a gateway, or a Mobility Management Entity (MME), or other servers or network elements providing services for the D2D.

In one embodiment, the network side device 2 can also be network elements temporarily deployed in a scenario without coverage.

In one embodiment, the network side device 2 can also be a UE serving as a Cluster Head or a Primary UE, for example, in certain specific scenarios such as a scenario without network coverage.

Figure 6:
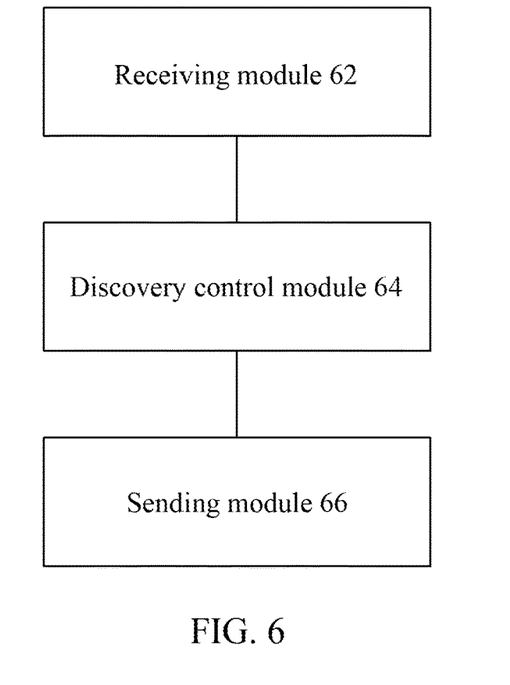
FIG. 6 is a schematic diagram of structure of communication device 2 according to the embodiment of the document.

In one embodiment, the first user equipment 4 can include a communication device of the D2D communication system as shown in FIG. 6. As shown in FIG. 6, the communication device of the D2D communication system in the first user equipment 4 can include:

a receiving module 62, acquiring device discovery configuration information, the device discovery configuration information at least including information used for indicating a time domain location of a device discovery radio resource. The D2D discovery configuration information can be received and obtained from the network side 2, but the document is not limited to such acquisition way.

It should be noted that the device discovery radio resource indicated by the device discovery configuration information acquired by the receiving module is a D2D dedicated resource, and has a specific configuration period in a time domain, one or more time units of the device discovery radio resource are included within the configuration period of the device discovery radio resources, a time unit of the device discovery radio resource includes one or more time elements, and the time elements are symbols, slots or subframes.

A discovery control module 64, connected to the receiving module 62, and used for determining a radio resource location for sending a D2D discovery signal at least according to the device discovery configuration information.

In an optional scheme, the discovery control module 64 is also used for determining transmission timing of the D2D discovery signal, and determining configurations related to a PPDCH channel;

a sending module 66, connected to the discovery control module 64, and used for sending the D2D discovery signal at the determined radio resource location, namely, the PPDCH.

The above sending module can send the D2D discovery signal according to a sending period at the determined radio resource location; or randomly select time units of the device discovery radio resource from the device discovery radio resource indicated by the device discovery configuration information and send the D2D discovery signal, and randomly select a time interval for sending the D2D discovery signal next time.

Wherein, the above sending period can be determined in any one of the following ways:

determining the sending period in a random way;

determining the sending period according to common configuration information or user equipment-specific configuration information;

determining the sending period according to a pre-determined rule.

In addition, when sending the D2D discovery signal at the determined radio resource location, the sending module can send the D2D discovery signal in any one of the following ways:

sending the D2D discovery signal according to downlink receiving timing of a cellular link;

sending the D2D discovery signal according to uplink transmitting timing of the cellular link;

sending the D2D discovery signal according to a timing advance parameter carried in the device discovery configuration information;

determining timing in accordance with an RRC state of the UE sending the D2D discovery signal, when the UE is in a connected state, sending the D2D discovery signal according to the uplink transmitting timing of the cellular link, and when the UE is in a non-connected state, sending the D2D discovery signal according to the downlink receiving timing of the cellular link;

determining timing in accordance with a cellular link uplink synchronization state of the UE sending the D2D discovery signal, when the UE is in uplink synchronization, sending the D2D discovery signal according to the uplink transmitting timing of the cellular link, and when the UE is in an uplink non-synchronization state, sending the D2D discovery signal according to the downlink receiving timing of the cellular link; or obtaining receiving timing by monitoring a D2D discovery signal of other equipment, and sending the D2D discovery signal according to the obtained receiving timing.

Figure 7:
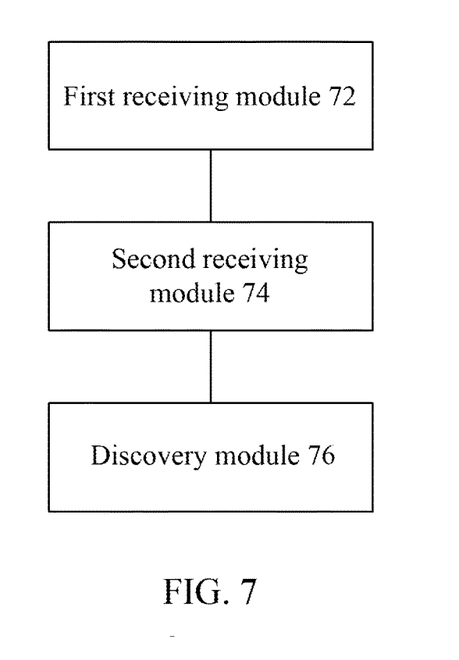
FIG. 7 is a schematic diagram of structure of communication device 3 according to the embodiment of the document.

In one embodiment, the second user equipment 6 can include a communication device of the D2D communication system as shown in FIG. 7. As shown in FIG. 7, in the embodiment, the communication device of the D2D communication system located in the second user equipment 6 can include:

a first receiving module 72, used for receiving device discovery configuration information from a network side;

a second receiving module 74, used for receiving a D2D discovery signal according to the device discovery configuration information; and a discovery module, used for detecting the D2D discovery signal received by the second receiving module and discovering an adjacent UE.

Embodiment 2

The present embodiment provides a discovery method in a D2D communication system, and the method can be implemented through the above communication device located in the D2D communication system of the first user equipment.

Figure 8:
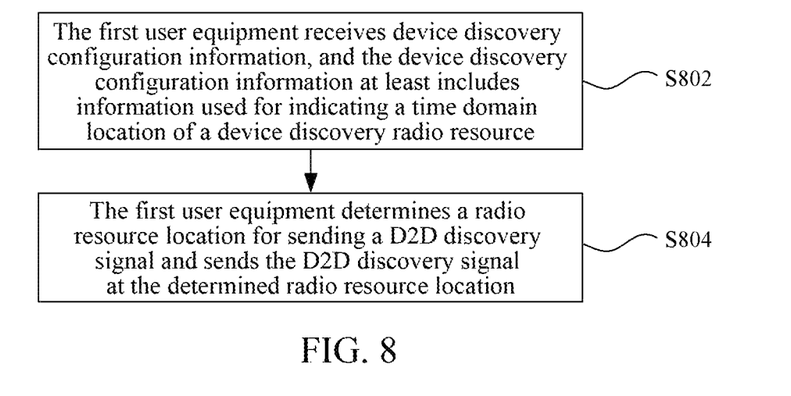
FIG. 8 is flow diagram 1 of a D2D discovery method according to the embodiment of the document.

FIG. 8 is a flow diagram of a method for sending a D2D discovery signal in the D2D communication system according to the embodiment of the document, and as shown in FIG. 8, the method can include the following step S802 to step S804:

In step S802, the first user equipment receives device discovery configuration information from a network side, wherein, the device discovery configuration information at least includes information used for indicating a time domain location of a device discovery radio resource;

it should be noted that the device discovery radio resource indicated by the above device discovery configuration information is a D2D dedicated resource, and has a specific configuration period in a time domain, one or more time units of the device discovery radio resource are included within the configuration period of the device discovery radio resource, a time unit of the device discovery radio resource includes one or more time elements, and the time elements are symbols, slots or subframes.

In step S804, the first user equipment determines a radio resource location for sending a D2D discovery signal according to the device discovery configuration information, and sends the D2D discovery signal at the determined radio resource location.

In one embodiment, the device discovery configuration information also can include a timing advance parameter, and it also can include configuration parameters of a discovery channel.

According to the embodiment of the document, a discovery method in a D2D communication system is also provided, and the method can be carried out through the communication device or system in the above D2D communication system.

Figure 9:
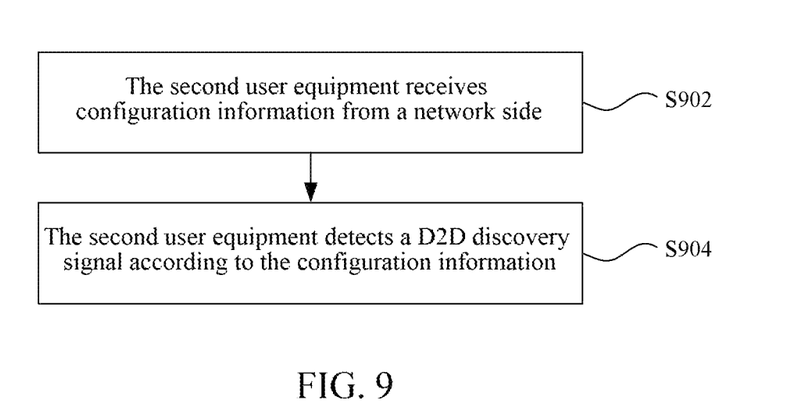
FIG. 9 is flow diagram 2 of the D2D discovery method according to the embodiment of the document.

FIG. 9 is a flow diagram of a companion discovery method in the D2D communication system according to the embodiment of the document, and as shown in FIG. 9, the companion discovery method in the D2D communication system mainly includes the following step S902 to step S904:

in step S902, the second user equipment receives device discovery configuration information from a network side;

in step S904, the second user equipment detects a D2D discovery signal from the second user equipment according to the device discovery configuration information.

In one embodiment, the above device discovery configuration information also can include a timing advance parameter, and it also can include configuration parameters of a physical channel.

Embodiment 3

The D2D discovery discussed in the embodiment of the document is implemented based on the D2D discovery signal directly transmitted between the UEs (in some documents, the discovery signal is also referred to as a beacon), and it is required to use the allocated radio resource in transmitting the D2D discovery signal. In an in-network scenario, the radio resource used in transmitting the D2D discovery signal can be allocated by a network element or a network entity such as an eNB; and in an out-of-network scenario, it can be allocated using the discovery resource preconfigured or obtained when the UE is located within the coverage, or can be allocated by a network element temporarily deployed, or can also be allocated by a cluster head, for example, several D2D UEs constitute one D2D cluster, and a UE serves as a cluster head in the cluster. That is, it is the network side device mentioned in the foregoing embodiment.

Figure 10A:
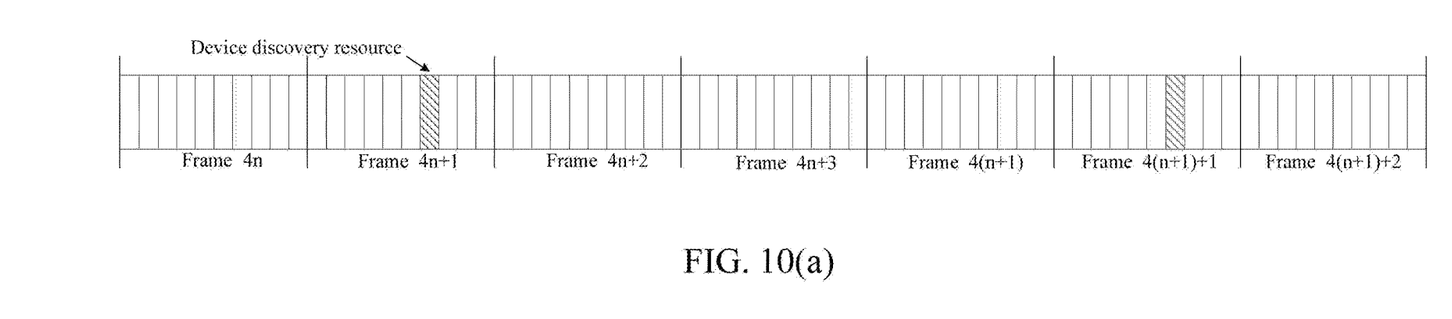

The time domain radio resource used for the D2D discovery signal transmission can be periodic resource. For example, subframes are allocated for transmitting the D2D discovery signal, and the distribution of the subframes is periodic. For example, as shown in FIG. 10 (*a*), subframes are allocated in a period of 40 ms for the D2D discovery (that is, a configuration period of the device discovery radio resource is 40 ms), and one D2D discovery subframe is included in each period. Here the 40 ms is an example, any integral value can be taken as a period of allocating the D2D discovery subframes in theory, and alternatively, the discovery subframes can be configured in a period of an integral multiple of a radio frame, namely, 10 ms (that is, the configuration period is the integral multiple of the radio frame), or the discovery subframes can also be configured in a period of a multiple of 8 ms.

Figure 10B:
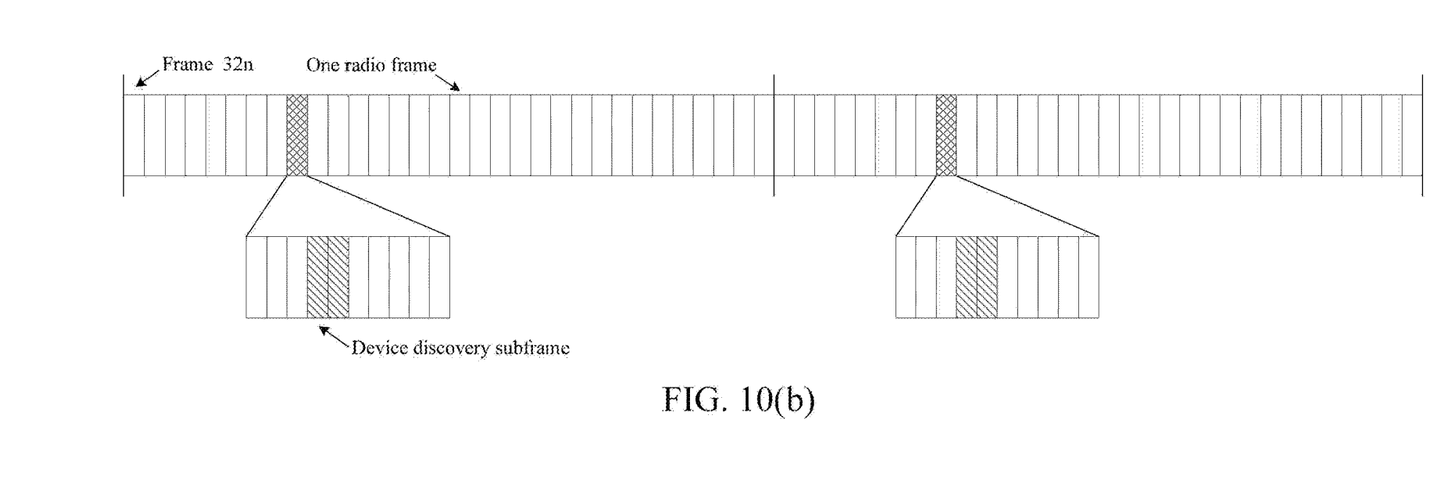

In the above example, it is also an example that one D2D discovery subframe is included in each configuration period, for example, it can be a plurality of subframes, such as a plurality of continuous subframes, to increase resources of the D2D discovery, or to be used for the D2D discovery configuration in a cell with large coverage. For example, as shown in FIG. 10 (*b*), two continuous subframes for transmitting the D2D discovery signal are included in each configuration period.

Figure 10C:
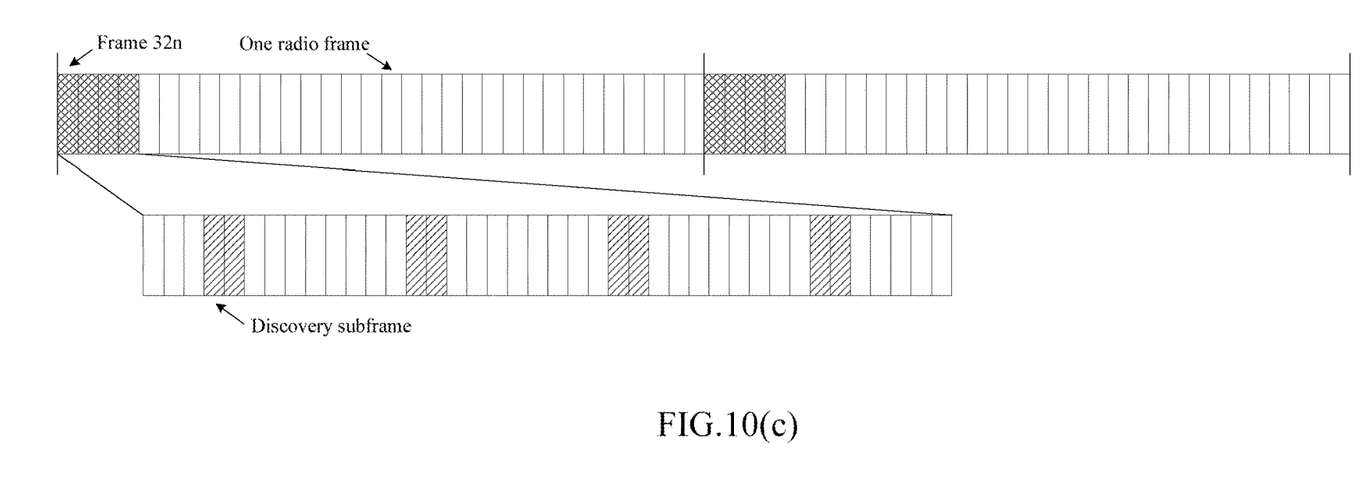

When a plurality of subframes is included in each D2D discovery resource period, the plurality of subframes can also be distributed in a form of pattern. For example, as shown in FIG. 10 (*c*), the D2D discovery resources (subframes) are allocated in a period of 32 radio frames (320 ms) (that is, the configuration period of the device discovery radio resource is 320 ms), only the first 4 radio frames (40 ms) within each configuration period has the D2D discovery subframes, and the D2D discovery subframes within the 4 radio frames are allocated in the form of pattern, such as a pattern shown in the second row of subframes in FIG. 10 (c).

In the above example, the time-domain device discovery radio resource is allocated by means of allocating the subframes. For an easy description, a concept of time unit is defined in the document. In one time unit, only transmission of one D2D discovery signal or PPDCH can be accommodated in the time direction, that is, the time unit is a minimum time element bearing the D2D discovery signal.

In one embodiment, a device discovery time unit can be set with a subframe as a time element. That is, transmission of each D2D discovery signal or PPDCH occupies one or more subframes in the time domain. For example, if a length of the time unit is one subframe, with regard to the configuration shown in FIG. 10 (a), one device discovery time unit is included within each device discovery radio resource period; with regard to the configuration shown in FIG. 10 (b), two device discovery time units are included within each device discovery radio resource period; and with regard to the configuration shown in FIG. 10 (c), eight device discovery time units are included within each device discovery radio resource period.

For another example, if the length of the time unit is two subframes, with regard to the configuration shown in FIG. 10 (b), one device discovery time unit is included within each device discovery radio resource period; and with regard to the configuration shown in FIG. 10 (c), four device discovery time units are included within each device discovery radio resource period.

It should be noted that, when the device discovery time unit is set with a subframe as a unit, the transmission of each D2D discovery signal or PPDCH occupies one or more subframes in the time domain, but in one or the plurality of subframes, a guard interval may be set, for example, the guard interval is included in the D2D discovery signal or PPDCH, or, the guard interval is attached after the D2D discovery signal or PPDCH, and a total time length of the time unit is one or more subframes.

In one embodiment, a device discovery time unit can be set with a slot as a time element. That is, transmission of each D2D discovery signal or PPDCH occupies one or more slots in the time domain. For example, if a length of the time unit is one slot, with regard to the configurations shown in FIG. 10a/10b/10c, 2/4/16 device discovery time units are respectively included within each device discovery radio resource period. It will not be repeated.

It should be noted that, when the device discovery time unit is set with the slot as the time element, the transmission of each D2D discovery signal or PPDCH occupies one or more slots in the time domain, but in one or the plurality of slots, a guard interval may be set, for example, the guard interval is included in the D2D discovery signal or PPDCH, or, the guard interval is attached after the D2D discovery signal or PPDCH, and a total time length of the time unit is one or more slots.

In one embodiment, a device discovery time unit can be set with an OFDM/SC-FDM symbol as a time element. That is, transmission of each D2D discovery signal or PPDCH occupies one or more OFDM symbols or SC-FDM symbols in the time domain. For example, it is assumed that the subframe has an extended CP length, a length of the device discovery time unit can be configured as three OFDM symbols or SC-FDM symbols, and four device discovery time units can be configured in one subframe.

When the device discovery time unit is set with the OFDM/SC-FDM symbol as the time element, only part of OFDM/SC-FDM symbols in the subframe can be set as the D2D discovery radio resource, for example, the length of the time unit is one OFDM symbol or SC-FDM symbol, and one time unit can be set only in the subframe, for example, the last OFDM symbol or SC-FDM symbol in the subframe is the device discovery time unit. It will not be repeated.

It should be noted that, when the device discovery time unit is set with an OFDM/SC-FDM symbol as the time element, a guard interval may be set, for example, the guard interval is set in front or back of the transmitted D2D discovery signal or PPDCH symbol, and a length of the guard interval can be set with the OFDM/SC-FDM symbol as the time element or can be set with as the time element. Wherein the Ts is a Basic time unit in the LTE system, and seconds (s).

It should be noted that all the numerical values and the patterns of the D2D discovery subframes in the present example are an example, which does not constitute a limitation to the scheme.

Embodiment 4

In this embodiment, a UE sends a D2D discovery signal in a periodic way, and a sending period of the D2D discovery signal is an integral multiple of a configuration period of the D2D discovery radio resource.

In one embodiment, the sending period of the D2D discovery signal is randomly selected by the UE, for example, with regard to the resource configuration way shown in the FIG. 10 (a), the configuration period of the radio resource is 40 ms, the sending period selected by the UE is N times the configuration period (40 ms) of the radio resource, N is a positive integer, and then a period of the UE actually transmitting the D2D discovery signal is N*40 ms.

In this embodiment, it is assumed that each configuration period of resource includes K D2D discovery time units, and then a total of K*N D2D discovery time units are included within one sending period, the UE will only send the D2D discovery signal one time within one sending period, and one time unit can be selected from the K*N time units to send the D2D discovery signal. For example, in one sending process, one time unit is randomly selected, in every time of sending of the process, a time unit location for sending the D2D discovery signal is fixed within the sending period. With regard to the example shown in the FIG. 10 (a), when each subframe includes one D2D discovery time unit, N time domain discovery resources are included in one sending period, and the UE can randomly select one from the time domain discovery resources to send the D2D discovery signal.

Or, in this embodiment, the time unit location specifically used for sending the D2D discovery signal within the sending period can be calculated through a pre-determined or pre-defined rule. For example, the pre-determined calculation rule is n=mod (UE_ID, K*N), wherein the implications of the K and N are the same as the foregoing, n represents a specific time unit location for transmitting the D2D discovery signal within the D2D discovery signal transmission period, and the UE_ID is a UE identity, which can be an International Mobile Subscriber Identity (IMSI) of the UE, or part of fields of the IMSI, or a Radio Network Temporary Identity (RNTI) of the UE, or an ID related to the D2D or D2D discovery.

A maximum value range of the N also can be limited, for example, N≤Nmax is limited, wherein a value of the Nmax is a positive integer, which can be appointed in the protocol or can be configured by the network side to the UE through the device discovery configuration information.

A minimum value range of the N also can be further limited, for example, N≥Nmin is limited, wherein a value of the Nmin is a positive integer, which can be appointed in the protocol or can be configured by the network side to the UE through the device discovery configuration information.

Besides the time units in which the UE sends the D2D discovery signal in the D2D discovery radio resource, the UE also can monitor D2D discovery signals sent by other UEs.

In one embodiment, the sending period of the D2D discovery signal is configured to the UE. For example, the value of the above N is configured by the network side to the UE. Such configuration can be a configuration way of UE-specific signaling, for example, the network side performs point-to-point configuration with respect to each UE, that is, the sending period is determined according to user equipment-specific configuration information. Such configuration can also be a non-UE-specific form. For example, the network configures a same N with regard to one group of UEs, for example, the group of UEs are UEs belonging to the same discovery area, or UEs belonging to the same Track Area, or UEs belonging to the same cell, or UEs belonging to the same cluster; or they are UEs with particular characteristics, such as UEs whose same services are similar, or UEs with same services within a particular area. With regard to the configuration information configured in such non-UE-specific form, it also can be called common configuration information.

After the sending period of the D2D discovery signal is determined, a specific time domain resource location for transmitting the D2D discovery signal within the period can be determined by means of the UE making a random selection. For example, with regard to the resource configuration way shown in the FIG. 10 (a), it is assumed that one subframe includes one time unit of the device discovery radio resource, thus N time units of the device discovery radio resource are included within one D2D discovery signal transmission period, and the UE can randomly select one from the N time units of the device discovery radio resource to send the D2D discovery signal. It is assumed that one subframe includes two time units of the device discovery radio resource, thus 2N time units of the device discovery radio resource are included within one D2D discovery signal transmission period, and the UE can randomly select one from the 2N time units of the device discovery radio resource to send the D2D discovery signal. The radio resource configuration ways of the D2D discovery shown in the FIG. 10 (b) and FIG. 10 (c) or other radio resource configuration ways of the D2D discovery can be in the similar processing, which will not be repeated.

Or, after the sending period of the D2D discovery signal is determined, a specific time domain resource location for transmitting the D2D discovery signal within the period can be determined by means of appointment or configuration. For example, the network configures the time domain resource location in which the UE transmits the D2D discovery signal within the transmission period in a UE-specific configuration way. It is assumed that there are K time units of the device discovery radio resources within each D2D discovery signal resource period, thus there are K*M time units of the device discovery radio resource within each D2D discovery signal transmission period, and one time unit can be configured within the K*M time units of the device discovery radio resource for a particular UE transmitting the D2D discovery signal.

Or, after the sending period of the D2D discovery signal is determined, a specific time unit location of the device discovery radio resource for transmitting the D2D discovery signal within the sending period can be calculated according to a pre-determined or pre-defined rule. For example, the pre-determined calculation rule is n=mod (UE_ID, K*M), wherein the implications of the K and M are the same as the foregoing, n represents the specific time unit location of the device discovery radio resource for transmitting the D2D discovery signal within the D2D discovery signal transmission period, and the UE_ID is a UE identity, which can be an IMSI of the UE, or part of fields of the IMSI, or an RNTI of the UE, or an ID related to the D2D or D2D discovery.

Besides the time domain resource in which the UE sends the D2D discovery signal in the D2D discovery resource, the UE can monitor D2D discovery signals sent by other UEs.

Embodiment 5

In this embodiment, a UE sends a D2D discovery signal in a periodic way, and the sending period is the same as a D2D discovery resource period.

In one embodiment, a plurality of time units of the device discovery radio resource is included within one D2D discovery resource period, and the UE randomly selects one time unit therein to transmit the D2D discovery signal.

For example, with regard to the resource configuration way shown in the FIG. 10 (a), one D2D discovery subframe is included within one D2D discovery resource period, namely, one D2D discovery signal sending period, if each discovery subframe includes two time units of the device discovery radio resource, the UE can randomly select one from the two time units of the device discovery radio resource within each sending period to send the D2D discovery signal.

For example, with regard to the resource configuration way shown in the FIG. 10 (b), two D2D discovery subframes are included within one D2D discovery resource period, namely, one D2D discovery signal sending period, if each discovery subframe includes one time unit of the device discovery radio resource, the UE can randomly select one from the two device discovery time units within each sending period to send the D2D discovery signal.

For example, with regard to the resource configuration way shown in the FIG. 10 (c), eight D2D discovery subframes are included within one D2D discovery resource period, namely, one D2D discovery signal sending period. If every two subframes correspond to one time unit of the device discovery radio resource, the UE can randomly select one from the four device discovery time units within one sending period to send the D2D discovery signal.

It should be noted that the randomness can be randomly selecting a sending location within each transmission period, or randomly selecting a sending location within one sending process. One sending process may include a plurality of times of sending the discovery signal, and randomly selecting one in one sending process means that sending locations in the plurality of times of sending are identical within the D2D discovery resource period.

Besides the device discovery time units in which the UE sends the D2D discovery signal in the D2D discovery resource, the UE can monitor D2D discovery signals sent by other UEs.

In one embodiment, a plurality of time units of the device discovery radio resource are included within one D2D discovery resource period, and the UE calculates a time unit location used for transmitting the D2D discovery signal within the sending period according to a pre-determined or pre-defined rule. For example, the pre-determined calculation rule is N=mod (UE_ID, K), wherein the implications of the K and M are the same as the foregoing, N represents a specific time unit location for transmitting the D2D discovery signal within the D2D discovery signal transmission period, namely, the D2D discovery resource time domain configuration period, and the UE_ID is a UE identity, which can be an IMSI of the UE, or part of fields of the IMSI, or an RNTI of the UE, or an ID related to the D2D discovery.

Besides the device discovery time units in which the UE sends the D2D discovery signal in the D2D discovery resource, the UE can monitor D2D discovery signals sent by other UEs.

In one embodiment, there is a plurality of time units of the device discovery radio resource within one D2D discovery resource period, and a time unit location in which the UE transmits the D2D discovery signal is configured in a UE-specific way. For example, it is assumed that there are K time domain discovery resources within the D2D discovery signal transmission period, namely, the D2D discovery resource time domain configuration period, one time domain discovery resource is configured for the UE as the time domain resource for the UE transmitting the D2D discovery signal. The configuration can be executed by the network side of the cellular network, and it can also be configured by other UEs such as a primary UE or a UE serving as a cluster head.

Besides the device discovery time units in which the UE sends the D2D discovery signal in the D2D discovery resource, the UE can monitor D2D discovery signals sent by other UEs.

Embodiment 6

In this embodiment, a UE selects slots to send a D2D discovery signal.

In one embodiment, after sending the D2D discovery signal, the UE randomly selects a time interval for sending the D2D discovery signal next time, and the interval can be spaced device discovery time unit number or spaced D2D discovery resource period number. For example, with regard to the resource configuration way shown in the FIG. 10 (a), an interval L is randomly selected to send the D2D discovery signal, for example, the interval L is spaced D2D discovery signal resource period number. After sending the D2D discovery signal every time, the UE will always randomly generate an interval and determine a time unit location for sending the D2D discovery signal next time according to the interval.

A maximum value range of the interval L also can be limited, for example, L≤Lmax is limited, wherein a value of the Lmax is a positive integer, which can be appointed in the protocol or can be configured by the network side to the UE through the device discovery configuration information.

A minimum value range of the interval L also can be limited, for example, L≥Lmin is limited, wherein a value of the Lmin is a positive integer, which can be appointed in the protocol or can be configured by the network side to the UE through the device discovery configuration information.

Besides the device discovery time units in which the UE sends the D2D discovery signal in the D2D discovery resource, the UE can monitor D2D discovery signals sent by other UEs.

Embodiment 7

In this embodiment, a UE sends a D2D discovery signal according to pre-determined timing.

In one embodiment, the pre-determined timing is downlink receiving timing of the UE in the cellular network. For example, the UE determines the downlink receiving timing of the cellular network by detecting a primary synchronization signal, a secondary synchronization signal and/or a downlink reference signal, and sends the D2D discovery signal based on the downlink receiving timing. Sending the D2D discovery signal based on the downlink receiving timing also can be understood as that the UE assumes a timing advance TA=0 to send the D2D discovery signal, that is, an offset between timing of a subframe in which the D2D discovery signal is located and timing of a subframe of a corresponding downlink serial number is 0, or a start of the D2D discovery signal is aligned with a start of the subframe of the corresponding downlink serial number at the UE.

In one embodiment, the pre-determined timing is uplink transmitting timing of the UE in the cellular network. For example, the UE obtains a timing advance value from the network side, and sends the D2D discovery signal with the timing advance value, that is, timing of a subframe in which the D2D discovery signal is located is the same as timing of a corresponding uplink subframe, or a start of the D2D discovery signal is aligned with a start of the corresponding uplink subframe at the UE.

In one embodiment, the pre-determined timing is the UE performing timing advance to send the D2D discovery signal based on the downlink receiving timing of the cellular network, and a timing advance value is indicated to the UE through the device discovery configuration information. For example, the UE obtains the timing advance value from the device discovery configuration information sent by the network side, and sends the D2D discovery signal with the timing advance value.

In one embodiment, the pre-determined timing is determined according to an RRC state of the UE. For example, when the UE sending the D2D discovery signal is in a connected state, the UE sends the D2D discovery signal according to the uplink transmitting timing of the cellular link, which will not be repeated; and when the UE is in a non-connected state, the UE sends the D2D discovery signal according to the downlink receiving timing of the cellular link, which will not be repeated.

In one embodiment, the pre-determined timing is determined according to a cellular link uplink synchronization state of the UE. For example, when the UE sending the D2D discovery signal is in a synchronization state in the cellular uplink, the UE sends the D2D discovery signal according to the uplink transmitting timing of the cellular link, which will not be repeated; and when the UE is in a non-synchronization state in the cellular uplink, the UE sends the D2D discovery signal according to the downlink receiving timing of the cellular link, which will not be repeated.

In one embodiment, the pre-determined timing is determined according to timing of a D2D discovery signal detected by the UE. For example, before sending a D2D discovery signal, the UE detects the D2D discovery signal, and determines timing of sending the D2D discovery signal according to the detected timing of the D2D discovery signal, for example, the timing of sending the D2D discovery signal is aligned with the detected timing of the D2D discovery signal. When there is a plurality of the detected D2D discovery signals, the UE is subject to a timing with the strongest signal, and the strongest signal can be a maximum signal to interference plus noise ratio of the received signal, or maximum absolute power of the received signal, or a maximum peak value of the related peak of the received signal.

Embodiment 8

In this embodiment, a UE determines configuration parameters of a physical discovery channel PPDCH according to configurations of the network or according to an appointment.

The above configuration parameters include but are not limited to one of the following:

a start of the time domain OFDM/SC-FDM symbol, a number of time domain OFDM/SC-FDM symbols, a location of the frequency domain RB, a start of the frequency domain RB, a bandwidth of the frequency domain RB, a modulation coding scheme MCS, and a discovery channel load.

In one embodiment, the network configures an OFDM/SC-FDM symbol used for transmitting the PPDCH for the UE. For example, a start of the OFDM/SC-FDM symbol and a symbol location can be configured, for example, it starts from the 1st symbol in the subframe and ends at the 13th symbol, or starts from the 2nd symbol and ends at the 13th symbol, or starts from the 1st symbol and ends at the Nth symbol, N is a positive integer and is less than or equal to 14*M, M is the number of subframes occupied by one PPDCH in the time domain, i.e., the number of subframes occupied by one device discovery time unit, and N depends on a cell coverage scope or other factors.

Or, for example, the start of the OFDM/SC-FDM symbol can be configured, the number of symbols is determined by means of appointment, and the appointment refers to an appointment between the network side and the UE. It will not be repeated.

It should be noted that the above numerical values are only used to describe that the number of symbols occupied by the PPDCH and the location are configured by the network, which does not constitute a limitation.

In this embodiment, frequency domain resources for transmitting the PPDCH are also configured by the network. For example, the network configures a specific location of the frequency domain RB, the configuration way can be the three Resource Allocation (RA) ways defined in the LTE system, such as an RA type 0 or an RA type 1 or an RA type 2, when there is a plurality of PPDCH frequency domain resources, each frequency domain resource can be respectively configured; and the configuration way also can be a way based on the bitmap. Or the network only configures a start of the frequency domain RB, and a bandwidth size of the RB can be appointed.

Or, in this embodiment, the frequency domain resources for transmitting the PPDCH can be at appointed locations. For example, at the inner side of PUCCH resources in the uplink frequency band, a particular number of RBs adjacent to the PUCCH are taken as the frequency domain resources of the PPDCH. Or at the inner side of PUCCH resources in the uplink frequency band, particular RBs that have a fixed interval with the PUCCH are taken as the frequency domain resources of the PPDCH. Or, they are frequency domain resources with fixed locations in the uplink frequency band, such as a particular number of RBs at the center of the frequency band. Or the rest frequency domain RBs except the PUCCH resources in the uplink frequency band are used for the PPDCH transmission, the specific resource allocation of the PPDCH is defined according to a pre-determined rule, for example, starting from the first low-frequency non-PUCCH RB, every a fixed number of RBs are taken as one PPDCH resource, if all available frequency domain RBs are not divisible by the number of RBs occupied by one PPDCH, the RBs that are not divisible will be remained at the end of the available resources of the frequency band.

In this embodiment, if the frequency domain RBs occupied by each PPDCH are determined by means of appointment, it can be a fixed number of RBs, for example, the number of RBs occupied by each PPDCH is pre-defined; or it can be a variable number of RBs, for example, with respect to different OFDM/SC-FDM symbol configurations, the PPDCH has different numbers of RBs; or it can be a variable number of RBs, for example, according to an MCS of the PPDCH and an OFDM/SC-FDM symbol, the number of RBs occupied by the PPDCH is calculated, and the MCS can be configured by the network to the UE or be determined by means of appointment.

In one embodiment, the configuration of the time domain OFDM/SC-FDM symbol is determined by means of appointment. For example, 14 symbols in the subframe (the PPDCH has a common CP) are all used for the PPDCH transmission; or, 12 symbols in the subframe (the PPDCH has an extended CP) are all used for the PPDCH transmission; or, symbols used for transmitting the PPDCH in the subframe have pre-determined starts and numbers, such as a symbol location starting from the 1st symbol and ending at the 13th symbol, or a symbol location starting from the 2nd symbol and ending at the 13th symbol, etc.

In this embodiment, the network configures a location of the frequency domain RB used for the PPDCH transmission to the UE. For example, the network configures a specific location of the frequency domain RB, the configuration way can be the three Resource Allocation (RA) ways defined in the LTE system, such as an RA type 0 or an RA type 1 or an RA type 2, when there is a plurality of PPDCH frequency domain resources, each frequency domain resource can be respectively configured; and the configuration way also can be a way based on the bitmap. Or the network only configures a start of the frequency domain RB, and a bandwidth size of the RB can be appointed.

Or, in this embodiment, the location of the frequency domain RB for transmitting the PPDCH also can be appointed, and a specific appointment way is as the foregoing, which will not be repeated.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Correspondingly, each module/unit in the above embodiments can be implemented in a form of hardware, and also can be implemented in a form of software function modules. The document is not limited to any combination of hardware and software in a specific form.

The above description is only the optional embodiments of the document but is not used to limit the protection scope of the document. All the modifications, equivalent substitutions, and improvements, etc. made within the spirit and principle of the document shall fall into the protection scope of the document.

INDUSTRIAL APPLICABILITY

In the technical scheme of the document, the discovery problem of the D2D communication system can be solved, and it is compatible that a UE in an idle state and a UE in a connected state perform D2D discovery. The technical scheme of the document can also effectively avoid the problem of the failure of mutual discovery between UEs caused by different UEs simultaneously sending and monitoring the discovery signal, thus improving the universality of the device discovery method and device, and the periodic sending mode facilitates the terminal to track the discovery signal; and the technical scheme of the document also can apply to the device discovery in a scenario without network coverage in the meantime. Therefore, the document has a very strong industrial applicability.

What is claimed is:

1. A device discovery method, comprising:
a user equipment acquiring device discovery configuration information, wherein the device discovery configuration information comprises information used for indicating a time domain location of device discovery resource;
the user equipment determining device discovery resource for sending device-to-device (D2D) discovery signal according to the device discovery configuration information; and
the user equipment determining a device discovery resource time unit in the determined device discovery resource and a device discovery signal sending period;
the user equipment sending the D2D discovery signal according to the sending period at the determined device discovery resource time unit;
wherein, the device discovery resource is D2D dedicated resource, and has a configuration period in time domain, the device discovery resource comprises one or more device discovery resource time units in the configuration period, a device discovery resource time unit comprises one or more time elements, and the time elements are symbols, slots or subframes,
the user equipment determining the sending period according to user equipment-specific configuration information;
wherein, the sending period is an integral multiple of the configuration period of the device discovery resource, each sending period comprises one or more device discovery resource time units.

2. The device discovery method according to claim 1, wherein, the user equipment sending the D2D discovery signal according to the sending period at the determined device discovery resource time unit comprises:
indicating the determined device discovery resource time unit through the user equipment-specific configuration information.

3. The device discovery method according to claim 1, wherein, the user equipment sending the D2D discovery signal according to the sending period at the determined device discovery resource time unit comprises:
the user equipment sending the D2D discovery signal according to downlink receiving timing of a cellular link.

4. The device discovery method according to claim 1, wherein, the device discovery configuration information further comprises:
the configuration of frequency domain resource block for the device discovery resource.

5. The device discovery method according to claim 1, wherein, a user equipment acquiring device discovery configuration information comprises:
the user equipment acquiring the device discovery configuration information from a network side device of a cellular network, or acquiring the device discovery configuration information from another user equipment.

6. A user equipment, comprising
hardware configured to execute instructions stored in a non-transitory computer readable medium to execute steps in following modules: a receiving module, a discovery control module and a sending module, wherein:
the receiving module is configured to: acquire device discovery configuration information, wherein the device discovery configuration information comprises information used for indicating time domain location of device discovery radio resource;
the discovery control module is configured to: determine device discovery resource for sending a device-to-device (D2D) discovery signal according to the device discovery configuration information; and determine a device discovery resource time unit in the determined device discovery resource and a device discovery signal sending period;
the sending module is configured to: send the D2D discovery signal according to the sending period at the determined device discovery resource time unit;
wherein, the device discovery resource is D2D dedicated resource, and has a configuration period in time domain, the device discovery resource comprises one or more device discovery resource time units in the configuration period, a device discovery resource time unit comprises one or more time elements, and the time elements are symbols, slots or subframes;
wherein, the discovery control module is further configured to: determine the sending period according to user equipment-specific configuration information;
wherein, the sending period is an integral multiple of the configuration period of the device discovery resource, each sending period comprises one or more device discovery resource time units.

7. The user equipment according to claim 5, wherein, the sending module is configured to: send the D2D discovery signal at the determined device discovery resource time unit in following way:
sending the D2D discovery signal according to downlink receiving timing of a cellular link.

* * * * *